(12) United States Patent  
Lovett

(10) Patent No.: US 7,093,442 B2  
(45) Date of Patent: Aug. 22, 2006

(54) AUGMENTOR

(75) Inventor: Jeffery A. Lovett, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 247 days.

(21) Appl. No.: 10/426,671

(22) Filed: Apr. 30, 2003

(65) Prior Publication Data

US 2004/0216444 A1 Nov. 4, 2004

(51) Int. Cl.  
*F02K 3/10* (2006.01)

(52) U.S. Cl. .............................. 60/761; 60/762; 60/765

(58) Field of Classification Search ............... 60/226.1, 60/761, 762, 262, 263, 774, 766, 765, 764, 60/207  
See application file for complete search history.

(56) References Cited

U.S. PATENT DOCUMENTS

| | | | | |
|---|---|---|---|---|
| 2,780,915 A | * | 2/1957 | Peter ........................ | 60/39.821 |
| 2,847,821 A | * | 8/1958 | Brown ...................... | 60/39.821 |
| 2,880,573 A | * | 4/1959 | Karcher ..................... | 60/764 |
| 2,880,574 A | * | 4/1959 | Howald ...................... | 60/796 |
| 2,910,828 A | * | 11/1959 | Meyer et al. ................. | 60/266 |
| 2,929,203 A | * | 3/1960 | Henning, Jr. et al. ......... | 60/762 |
| 2,978,865 A | * | 4/1961 | Pierce ......................... | 60/762 |
| 3,712,062 A | * | 1/1973 | Nash ........................... | 60/766 |
| 3,938,328 A | * | 2/1976 | Klees .......................... | 60/262 |
| 4,069,661 A | * | 1/1978 | Rundell et al. ............... | 60/204 |
| 4,185,461 A | * | 1/1980 | Wilkinson .................... | 60/762 |
| 4,798,048 A | | 1/1989 | Clements | |
| 5,099,644 A | * | 3/1992 | Sabla et al. .................... | 60/207 |
| 5,136,840 A | * | 8/1992 | Nash .......................... | 60/226.3 |
| 5,385,015 A | | 1/1995 | Clements et al. | |
| 5,685,140 A | | 11/1997 | Clements et al. | |
| 5,867,980 A | * | 2/1999 | Bartos ........................ | 60/226.3 |
| 6,463,739 B1 | * | 10/2002 | Mueller et al. ............... | 60/765 |
| 6,668,541 B1 | * | 12/2003 | Rice et al. .................... | 60/207 |

* cited by examiner

*Primary Examiner*—William H. Rodriguez  
(74) *Attorney, Agent, or Firm*—Bachman & LaPointe, P.C.

(57) ABSTRACT

A turbine engine augmentor has a centerbody within a gas flowpath. A flameholder is positioned in the flowpath outboard of the centerbody. A burner within the centerbody has an outlet for expelling combustion products of a first pilot fuel. A pilot fuel conduit has an outlet positioned to introduce a supplemental pilot fuel to the expelled combustion products.

21 Claims, 2 Drawing Sheets

AUGMENTOR

BACKGROUND OF THE INVENTION (1) Field of the Invention

This invention relates to turbine engines, and more particularly to turbine engine augmentors.

(2) Description of the Related Art

Afterburners or thrust augmentors are known in the industry. A number of configurations exist. In a typical configuration, exhaust gases from the turbine pass over an augmentor centerbody. Additional fuel is introduced proximate the centerbody and is combusted to provide additional thrust. In some configurations, the augmentor centerbody is integrated with the turbine centerbody. In other configurations, the augmentor centerbody is separated from the turbine centerbody with a duct surrounding a space between the two. U.S. Pat. Nos. 5,685,140 and 5,385,015 show exemplary integrated augmentors.

The augmentor may feature a number of flameholder elements for initiating combustion of the additional fuel. Piloting devices are used to stabilize the flame on the flameholders which, in turn, distribute the flame across the flow path around the centerbody.

BRIEF SUMMARY OF THE INVENTION

Accordingly, one aspect of the invention involves a turbine engine augmentor. An augmentor centerbody may be located within a gas flowpath. An at least partially radially-extending flameholder is positioned in the flowpath and may be outboard of the centerbody. A burner which may be within the centerbody has an outlet for expelling combustion products of a first pilot fuel. A pilot fuel conduit has an outlet positioned to introduce a supplemental pilot fuel to the expelled combustion products to provide a pilot flame. There may be a number of such burner outlets circumferentially arrayed about an axis of the engine and positioned to place associated pilot flames in contact with associated flameholders. The burner may have a housing and a liner within the housing. Each of the burner outlets may comprise a liner outlet tube extending from the liner within a housing outlet tube extending from the housing. There may be a number of such pilot fuel conduits, each extending into the liner outlet tube of an associated one of the burner outlets. The centerbody may have a tailcone and a recessed area ahead/upstream of the tailcone. The burner outlet may be positioned within the recessed area. The recessed area may be a non-annular compartment. The pilot fuel conduit outlet may be positioned within the recessed area. The pilot fuel conduit may comprise a distal end portion of a spraybar extending within the flameholder.

Another aspect of the invention involves a turbine engine augmentor with a centerbody within a core flowpath of the engine. A flameholder is positioned in the core flowpath and extends radially outboard of the centerbody. A burner is positioned within the centerbody. The burner has a housing, an upstream inlet for receiving oxygen-containing gas, an igniter for initiating combustion of a pilot fuel with the gas, and a foraminate liner within the housing to direct products of the combustion downstream. A number of foraminate outlet conduits extend at least partially radially outward from the liner to direct the products toward the core flowpath. A number of cooling conduits each surround an associated one of the outlet conduits. A pilot fuel conduit has an outlet positioned to introduce a supplemental pilot fuel to the expelled combustion products to enhance the piloting effects of the expelled products.

Another aspect of the invention is a gas turbine engine. A compressor compresses inlet air. A combustor receives compressed air from the compressor and combusts a mixture of the compressed air and a fuel. A turbine extracts work from products of the combustion to drive the compressor and discharges the products as exhaust. An augmentor is located within a path of the exhaust and has a conduit receiving bypass air and a burner combusting a first portion of the bypass air. The augmentor includes a burner combusting a first portion of the bypass air with a burner fuel and discharging combustion products of the first portion and the burner fuel into the exhaust. The augmentor has an air conduit directing a second portion of the bypass air. A pilot fuel conduit directs a pilot fuel and is positioned relative to the air conduit and the burner so as to permit heat from the combustion products of the first portion and the burner fuel to ignite a mixture of the pilot fuel and the second portion of the bypass air.

Another aspect of the invention involves a method for operating a turbine engine augmentor. An exhaust gas is caused to flow from a turbine engine to an augmentor. Combustion of a first pilot fuel is caused to produce combustion products. A flow of the combustion products joins the exhaust gas flow. A supplemental pilot fuel is introduced to the flow of the combustion products.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
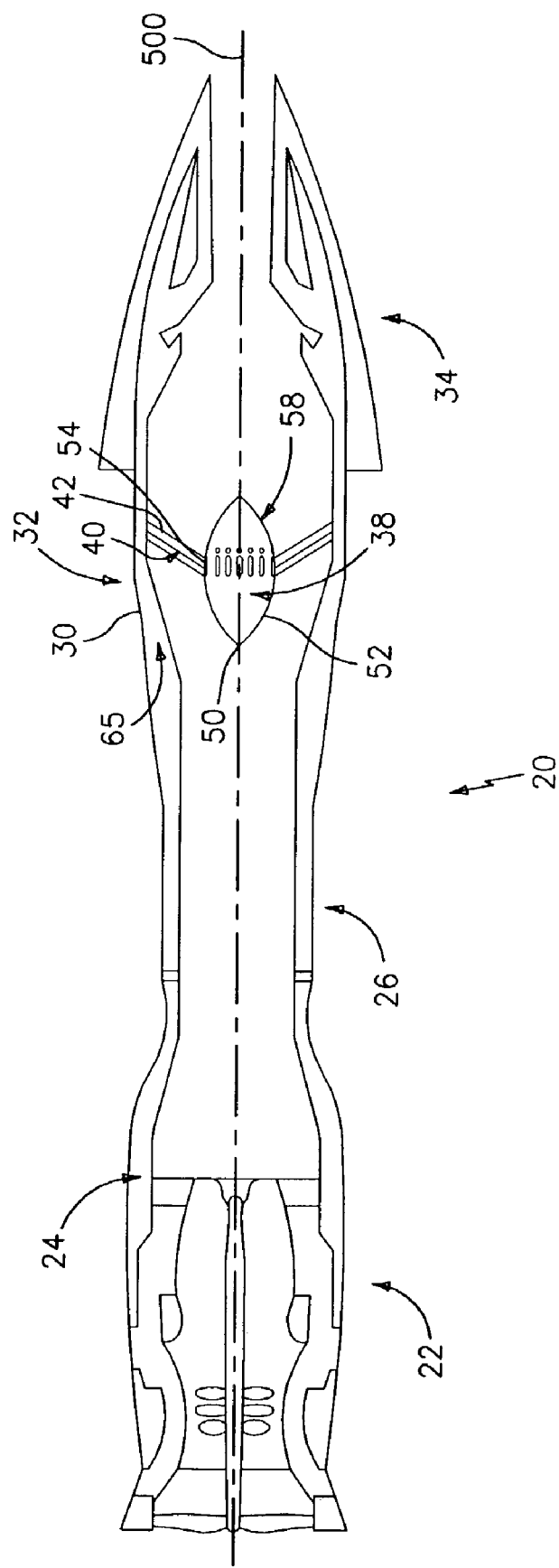
FIG. 1 is a schematic longitudinal sectional view of an aircraft powerplant.

FIG. 1 shows an exemplary powerplant 20 having a central longitudinal axis 500. From upstream to downstream, the powerplant includes a turbine engine 22 having a downstream turbine exhaust case (TEC) 24. A duct extension 26 extends from the TEC 24 to join with a housing 30 of an augmentor 32. A thrust vectoring nozzle assembly 34 extends downstream from the housing 30. The augmentor 32 includes a centerbody 38 centrally mounted within the gas flow path by means of radially-extending vanes 40. Each exemplary vane 40 includes a forward/upstream structural portion and aft/downstream flameholder element 42.

The centerbody 38 is generally symmetric around the axis 500. The centerbody has a forward tip 50 from which a continuously curving convex forebody or ogive 52 extends rearward until reaching a longitudinal or nearly longitudinal transition region 54 adjacent the flameholders 42. Aft of the transition region, a tailcone surface 58 extends to an aft extremity of the centerbody.

Figure 2:
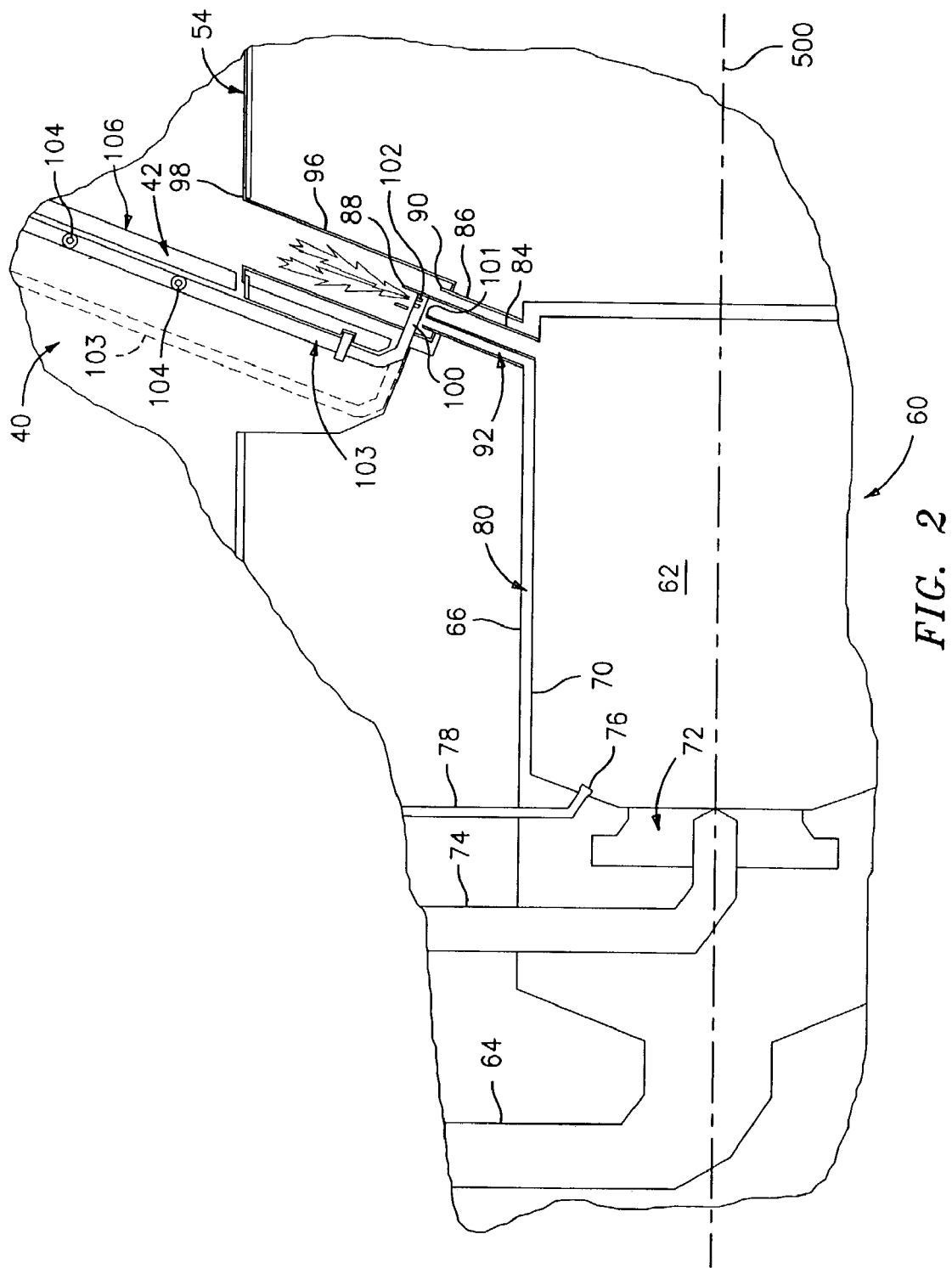
FIG. 2 is a partial, cut-away, semi-schematic, longitudinal sectional view of an augmentor pilot system for use in the powerplant of FIG. 1.

FIG. 2 shows further details of an exemplary pilot 60 for the augmentor. The pilot includes one or more burners 62 mounted within the centerbody. In the exemplary implementation, a single burner is mounted centrally within the centerbody. The burner includes one or more upstream conduits 64 directing air from a fan duct 65 (FIG. 1) between inner and outer elements of the housing to an upstream end of a burner outer housing 66. In an exemplary implementation, the conduit(s) 64 extend radially through associated vanes 40 to direct air radially inward from the fan duct. In the exemplary implementation, the housing 66 has an upstream end to which the conduit 64 longitudinally connects, a longitudinally-extending sidewall, and a closed downstream end. The housing 66 contains a foraminate liner 70. The liner 70 has an upstream end to which an air swirler 72 is mounted, a longitudinally-extending sidewall, and a closed downstream end. Each of one or more pilot fuel conduits 74 has a downstream outlet at the swirler 72 for delivering pilot fuel to the burner. As with the air conduit(s) 64, the pilot fuel conduit(s) 74 may extend through associated ones of the vanes or flameholders. An igniter 76 is mounted within the liner 70 and is powered via wiring 78. The wiring 78 may extend through one or more of the vanes.

In operation, a portion of the air delivered through the conduit 64 enters the liner 70 through the swirler 72. Additional portions enter through the holes in the liner, including a portion passing through the liner from an annular space 80 between the liner and housing sidewalls. A main portion of air is combusted with the fuel from the conduit 74 in response to ignition by the igniter 76. Mixture of the air and the fuel passing through the swirler may be relatively rich and leads to incomplete combustion. The air passing through the holes in the liner serves primarily to cool the liner and tends to lean out the products of the main combustion. Near the downstream end of the liner and housing, each have a circumferential array of radially-extending coaxial outlet tubes 84 and 86 having proximal inlets at the respective sidewalls of the liner and housing and distal outlets 88 and 90. In the illustrated embodiment, a distal end portion of each tube 84 protrudes beyond the outlet end 90 of the associated tube 86. As combustion products flow exiting from the liner interior proceeds through each tube 84, further air from the annular space 92 between the tube 84 and the associated tube 86 passes through holes in the tube 84. A final portion of the air originally introduced through the conduit 64 exits the annular outlet between each housing outlet tube end 90 and the associated liner outlet tube 84. In the exemplary embodiment, the outlet ends of each pair of tubes 84 and 86 are within an inboard end portion of a centerbody outlet tube 96 having an outboard outlet end 98 open at the transition region 54. The centerbody outlet tubes 96 thus define blind subannular (circular section in the exemplary embodiment) recesses or compartments into which the associated tubes 84 and 86 extend.

An additional pilot fuel conduit 100 is positioned to introduce additional fuel to the burner output. In the exemplary embodiment, this is introduced generally within the outlet tube 96. More particularly, it is introduced within an outlet end portion of the liner outlet tube 84. To achieve this, the exemplary conduit 100 penetrates the liner outlet tube 84 through an aperture 101 therein and has discharge openings 102 within the tube 84 just downstream of the outlet end 90 of the housing outlet tube 86 and just upstream of the outlet end 88 of the liner outlet tube 84. In the exemplary embodiment, the conduit 100 is formed as a distal end portion of a spraybar 103 (solid line) extending radially through an associated vane. The spraybar has, at either side, an array of circumferentially-directed nozzles 104 directing fuel into the gas flowpath around the centerbody. Air outlets and an air conduit (not shown) may also similarly be provided within each vane (e.g., as in U.S. Pat. No. 5,685,140).

In operation, the additional pilot fuel combusts upon introduction to the burner output and generates a flame including highly reactive species (e.g., oxygen atoms and hydrocarbon fragments) which contact and flow along the flameholder in the radial outward direction igniting the augmentor fuel emitted by the nozzles 104. These species may be relatively short-lived so that similar species generated by combustion of the principal pilot fuel will have largely died out prior to reaching the flameholders.

In an exemplary method of manufacture, the burner may be preassembled and installed within the centerbody as known in the art or otherwise. The liner outlet tube 84 is preformed with the aperture 101 complementary to the shape of the conduit 100. With the vane/flameholder installed relative to the centerbody, the spraybar 103 may be installed by initially inserting it inward and parallel to the vane/flameholder trailing edge 106 until it reaches its broken line position. Thereafter it may be shifted transverse to the trailing edge 106 to cause the conduit 100 to pass through the aperture 101 in the solid line showing. Mechanical and external plumbing connections may, thereafter, be made.

One or more embodiments of the present invention have been described. Nevertheless, it will be understood that various modifications may be made without departing from the spirit and scope of the invention. For example, the inventive pilot may be applied in a retrofit or redesign of an otherwise existing engine. In such cases, various properties of the pilot would be influenced by the structure of the existing engine. While illustrated with respect to an exemplary remote augmentor situation, the principles may be applied to non-remote augmentors and to augmentors wherein the burner is located out of the centerbody (if any) and/or the supplemental pilot fuel is introduced through the centerbody. Accordingly, other embodiments are within the scope of the following claims.

What is claimed is:

1. A turbine engine augmentor comprising:
a gas flowpath;
a flameholder positioned in the gas flowpath outboard of a centerbody;
a burner having an outlet for expelling combustion products of a first pilot fuel; and
a pilot fuel conduit having an outlet positioned to introduce a supplemental pilot fuel to the expelled combustion products within the centerbody.

2. The augmenter of claim 1 wherein the flameholder is a first of a plurality of flameholders and the pilot fuel conduit is a first of a plurality pilot fuel conduits, each aligned with an associated one of the plurality of flameholders.

3. The augmenter of claim 1 wherein the outlet of the burner is a first outlet of a plurality of burner outlets circumferentially arrayed about an axis of the engine.

4. The augmentor of claim 1 wherein the centerbody has a tailcone and a recessed area upstream of the tailcone and wherein said cutlet of said burner is positioned within said recessed area.

5. The augmentor of claim 4 wherein the recessed area is a non-annular compartment.

6. The augmentor of claim 4 wherein the outlet of the pilot fuel conduit is positioned within said recessed area.

7. The augmentor of claim 1 wherein the pilot fuel conduit comprises a distal end portion of a spray bar extending within a vane associated with the flameholder.

8. A turbine engine augmentor comprising:
a centerbody within a core flowpath of the engine;
a flameholder positioned in the core flowpath and extending radially outboard of the centerbody;
a burner within the centerbody and having:
   a housing;
   an upstream inlet for receiving oxygen-containing gas;
   an igniter for initiating combustion of a first pilot fuel with said oxygen-containing gas;
      a foraminate liner positioned within the housing to direct products of said combustion downstream;
      a plurality of foraminate outlet conduits extending at least partially radially outward from the liner to direct the products toward the core flowpath; and
   a plurality of cooling conduits, each surrounding an associated one of the outlet conduits; and
   a pilot fuel conduit having an outlet positioned to introduce a supplemental pilot fuel to the expelled combustion products.

9. The augmentor of claim 8 wherein the outlet of the burner is a first outlet of a plurality of burner outlets circumferentially arrayed about an axis of the centerbody.

10. A gas turbine engine comprising:
a compressor compressing inlet air;
a combustor receiving compressed air from the compressor and combusting a mixture of said compressed air and a fuel;
a turbine extracting work from products of said combusting to drive the compressor and discharging said products as exhaust; and
an augmentor within a path of said exhaust and having:
   a conduit receiving bypass air;
   a burner combusting a first portion of said bypass air with a burner fuel and discharging combustion products of said first portion of said bypass and said burner fuel into said exhaust through a burner outlet conduit;
   an air conduit directing a second portion of said bypass air, the burner outlet conduit passing within the air conduit; and
   a pilot fuel conduit directing a pilot fuel and positioned relative to said air conduit and said burner so as to permit beat from said combustion products of said first portion of said bypass and said burner fuel to ignite a mixture of said pilot fuel and said second portion of said bypass air.

11. A method for operating a turbine engine augmentor comprising:
causing an exhaust gas flow from a turbine engine to an augment or;
causing combustion of a first pilot fuel to produce combustion products, a flow of said combustion products joining said exhaust gas flow;
introducing a supplemental pilot fuel to said flow of said combustion products;
introducing a main augmentor fuel, separately from the first pilot fuel and the supplemental pilot fuel, reactive species of combustion of said supplemental pilot fuel igniting the main augmentor fuel.

12. A turbine engine augmentor comprising:
a gas if flowpath;
a flameholder positioned in the gas if flowpath;
a burner having an outlet for expelling combustion products of a first pilot fuel;
a pilot fuel conduit having an outlet positioned to introduce a supplemental pilot fuel to the expelled combustion products; and
a main augmentor fuel outlet positioned to introduce a main augmentor fuel to the expelled combustion products and combustion products of said supplemental pilot fuel to, in turn, ignite the main augmentor fuel,
wherein the flame holder is a first of a plurality of flameholders and the pilot fuel conduit is a first of a plurality pilot fuel conduits, each aligned with an associated one of the plurality of flameholders.

13. A turbine engine augmentor comprising:
a gas flowpath;
a centerbody within the gas if flowpath;
a flameholder positioned in the gas if flowpath outboard of the centerbody;
a burner within the centerbody and having:
   a housing;
   a liner within the housing; and
   a plurality of burner outlets expelling combustion products of a first pilot fuel, each comprising a liner outlet tube extending from the liner within a housing outlet tube extending from the housing; and
a pilot fuel conduit having an outlet positioned to introduce a supplemental pilot fuel to the expelled combustion products.

14. The augmentor of claim 13 wherein the pilot fuel conduit is a first conduit of a plurality of pilot fuel conduits, each extending into the liner outlet tube of an associated one of the burner outlets.

15. A turbine engine augmentor comprising:
a gas flowpath;
a centerbody in the gas flowpath and having a tailcone and a recessed area upstream of the tailcone
a flameholder positioned in the gas flowpath outboard of the centerbody;
a burner having an outlet for expelling combustion products of a first pilot fuel; and
a pilot fuel conduit having an outlet positioned within said recessed area to introduce a supplemental pilot fuel to the expelled combustion products.

16. The augmentor of claim 15 wherein the recessed area is a non-annular compartment.

17. The augmentor of claim 15 wherein the outlet of the pilot fuel conduit is positioned within said recessed area.

18. A method for operating a turbine engine augmentor comprising:
causing an exhaust gas flow from a turbine engine to an augmentor;
causing combustion of a first pilot fuel in an augmentor centerbody to produce combustion products, a flow of said combustion products exiting the centerbody and joining said exhaust gas flow, the centerbody extending generally fore-to-aft within the exhaust gas flow; and
introducing a supplemental pilot fuel to said flow of said combustion products within a recess in the centerbody.

19. A gas turbine engine comprising:
a compressor compressing inlet air;
a combustor receiving compressed air from the compressor and combusting a mixture of said compressed air and a fuel;
a turbine extracting work from products of said combusting to drive the compressor and discharging said products as exhaust;
a centerbody within a path of said exhaust and
an augmentor within the centerbody and having:
   a conduit receiving bypass air;
   a burner combusting a first portion of said bypass air with a burner fuel and discharging combustion products of said first portion of said bypass and said burner fuel into said exhaust;

an air conduit within the centerbody and directing a second portion of said bypass air; and a pilot fuel conduit directing a pilot fuel and positioned relative to said air conduit and said burner so as to permit heat from said combustion products of said first portion of said bypass and said burner fuel to ignite a mixture of said pilot fuel and said second portion of said bypass air.

20. A method for operating a turbine engine augmentor comprising:

causing an exhaust gas flow from a turbine engine to an augment or;

causing combustion of a first pilot fuel in an augmentor centerbody to produce combustion products, a flow of said combustion products exiting the centerbody and joining said exhaust gas flow;

introducing a supplemental pilot fuel to said flow of said combustion products;

introducing a main augmentor fuel, separately from the first pilot fuel and the supplemental pilot fuel, reactive species of combustion of said supplemental pilot fuel igniting the main augmentor fuel.

21. The method of claim 20 wherein;

the supplemental pilot fuel is introduced within a recess in the centerbody; and the centerbody extends generally fore-to-aft within the exhaust gas flow.

* * * * *

UNITED STATES PATENT AND TRADEMARK OFFICE
CERTIFICATE OF CORRECTION

PATENT NO.        : 7,093,442 B2
APPLICATION NO.   : 10/426671
DATED             : August 22, 2006
INVENTOR(S)       : Jeffery A. Lovett It is certified that error appears in the above-identified patent and that said Letters Patent is hereby corrected as shown below:

In column 4, claim 4, line 58, "cutlet" should read --outlet--.

In column 5, claim 10, line 43, "beat" should read --heat--.

In column 5, claim 11, line 50, "augment or" should read --augmentor--.

In column 5, claim 12, line 62, after "gas" "if" should be deleted.

In column 6, claim 13, line 11, after "gas" "if" should be deleted.

In column 6, claim 13, line 12, after "gas" "if" should be deleted.

In column 7, claim 20, line 14, "augment or" should read --augmentor--.

Signed and Sealed this

Seventeenth Day of April, 2007

JON W. DUDAS
*Director of the United States Patent and Trademark Office*